(12) United States Patent
Nehse et al.

(10) Patent No.: US 12,216,911 B2
(45) Date of Patent: Feb. 4, 2025

(54) STORAGE LAYOUT OF PROTECTION POOL OF A RAID STORAGE SYSTEM

(71) Applicant: EMC IP Holding Company LLC, Hopkinton, MA (US)

(72) Inventors: Paul Nehse, Livermore, CA (US); Michael Thiels, San Martin, CA (US); Devendra Kulkarni, Santa Clara, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 226 days.

(21) Appl. No.: 17/314,381

(22) Filed: May 7, 2021

(65) Prior Publication Data
US 2022/0357858 A1   Nov. 10, 2022

(51) Int. Cl.
*G06F 3/00* (2006.01)
*G06F 3/06* (2006.01)
*G06F 11/10* (2006.01)

(52) U.S. Cl.
CPC .......... *G06F 3/0619* (2013.01); *G06F 3/0631* (2013.01); *G06F 3/0644* (2013.01); *G06F 3/0665* (2013.01); *G06F 3/0689* (2013.01); *G06F 11/1076* (2013.01)

(58) Field of Classification Search
None
See application file for complete search history.

(56) References Cited

U.S. PATENT DOCUMENTS

| | | | |
|---|---|---|---|
| 7,603,529 B1 | 10/2009 | Machardy et al. | |
| 9,596,135 B1 | 3/2017 | Thomas et al. | |
| 9,641,615 B1* | 5/2017 | Robins | G06F 3/0604 |
| 9,848,042 B1* | 12/2017 | Parkhurst | G06F 3/0688 |
| 10,346,247 B1 | 7/2019 | Gao et al. | |
| 10,409,682 B1 | 9/2019 | Davies et al. | |
| 2007/0233997 A1* | 10/2007 | Kobara | G06F 3/061 |
| | | | 711/170 |
| 2008/0071985 A1 | 3/2008 | Koike | |
| 2013/0198448 A1* | 8/2013 | Ish | G06F 12/0871 |
| | | | 711/E12.019 |
| 2015/0033063 A1 | 1/2015 | Mills et al. | |
| 2016/0342358 A1 | 11/2016 | Otaka et al. | |
| 2019/0370042 A1 | 12/2019 | Gupta et al. | |
| 2021/0149576 A1 | 5/2021 | Edwards et al. | |
| 2022/0229568 A1* | 7/2022 | Danilov | G06F 3/0689 |
| 2022/0365694 A1* | 11/2022 | Nehse | G06F 3/0611 |

* cited by examiner

*Primary Examiner* — Midys Rojas
(74) *Attorney, Agent, or Firm* — WOMBLE BOND DICKINSON (US) LLP (57) ABSTRACT

A redundant array of independent disks (raid) array can include one or more virtual disks representing a raid configuration of the raid array. Each of the one or more virtual disks includes a number of physical extents (PEs), where a first PE and a second PE of the PEs have a same size. The first PE is located at a first storage disk of a first storage node of a cluster and the second PE is located at a second storage disk of a second storage node of the cluster.

20 Claims, 8 Drawing Sheets

STORAGE LAYOUT OF PROTECTION POOL OF A RAID STORAGE SYSTEM

CROSS-REFERENCE TO RELATED APPLICATIONS

This application is related to U.S. application Ser. No. 17/314,403 titled "A RAID Storage System with a Protection Pool of Storage Units," filed on May 7, 2021. The disclosure of which is hereby incorporated by reference in its entirety.

FIELD OF THE INVENTION

Embodiments of the present invention relate generally to data storage systems. More particularly, embodiments of the invention relate to a storage layout of protection pool of a redundant array of independent disks (RAID) storage system.

BACKGROUND

Customers are increasingly adopting different technologies for data storage. Both appliances and software only packages that can be deployed in a hypervisor environment are desired. The scale up architecture needs to be extensible to be deployed in both physical and virtual environments.

Traditional data storage systems use a scale up architecture which may require very large and complex disk farms to meet customer capacity and performance requirements. A protection pool architecture, for example, allows linear scaling of performance and capacity by adding storage nodes. This allows tenants of a multi-tenant storage node to start with smaller capacity nodes and incrementally scale the storage capacity as requirements change.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A redundant array of independent disks (RAID) array is a data storage virtualization technique that combines a number of physical disk together into one or more logical units for the purpose of data redundancy (e.g., mirroring), performance improvements (e.g., striping), or both. In a RAID array, data is distributed across the physical disks, in one of several ways (e.g., mirroring, striping, etc.), referred to as RAID levels. Different RAID levels provide a different redundancy scheme to balance reliability, availability, performance, and capacity of the RAID array.

Limitations of the traditional approach are: a RAID array supports data located on a single storage node and a unit of allocation being the set of physical disks that are allocated to the RAID array. By changing how a RAID array allocates and accesses disks, that is, from using physical disks to virtual disks that contain an addressable list of locations of storage on different physical disks, a RAID array is not confined to a single node nor a set of physical disks.

Embodiments of the present disclosure relates to a method/system for RAID arrays, where data for a RAID array can be spread across multiple disks or multiple nodes in a node cluster. Advantages of the embodiments include: a set of physical disks can be used by multiple RAID arrays, a RAID array is not confined to a single node, a unit of allocation is not confined to a set of physical disks that would be traditionally be allocated to the RAID array.

According to one aspect, redundant array of independent disks (raid) array includes one or more virtual disks representing a raid configuration of the raid array, where each of the one or more virtual disks includes a number of physical extents (PEs), where a first PE and a second PE of the PEs have a same size. The first PE is located at a first storage disk of a first storage node of a cluster and the second PE is located at a second storage disk of a second storage node of the cluster.

In one embodiment, each of the one or more virtual disks corresponds to a stripe unit index of the raid array. In one embodiment, a 6+2 raid configuration, where the one or more virtual disks of the 6+2 raid configuration comprise six data virtual disks and two parity virtual disks.

In one embodiment, each of the plurality of PEs has a unique identifier identifying a physical address of the PE, where the physical address of the PE includes: an address corresponding to a storage node, a storage disk of the storage node, and a logical block address on the storage disk. In one embodiment, a size of the PEs is configurable when the cluster is initially instantiated.

In one embodiment, an ownership of a PE is verified by a local disk manager of the PE in at least one of conditions: when the raid array with the PE is created, the raid array having the PE is expanded, or the PE is part of a parity virtual disk that is allocated to the raid array. In one embodiment, a PE is approvable by a local disk manager (LDM) before the PE is allocated to the raid array.

In one embodiment, the PE is not approved by the LDM if the LDM has approved the PE for another raid array. In one embodiment, the raid array is used by a file system running on the first storage node. In one embodiment, the raid array includes one of levels: raid 0, raid 1, raid 2, raid 3, raid 4, raid 5, raid 6, or a combination there of.

According to a second aspect, a storage node includes one or more processors and one or more storage disks, where the one or more storage disks include one or more local physical extents (PEs) that are local to the storage node, where a first of the one or more local PEs has a same size as a second of the one or more local PEs. The storage node includes a physical extent manager (PEM) executed by the one or more processors to run in a user space of the storage node. The storage node includes a protection pool driver executed by the one or more processors to run in a kernel space of the storage node, where the protection pool driver includes a local disk manager (LDM) and an array group module (AGRP). The LDM is configured to manage the one or more local PEs at the one or more storage disks. The AGRP includes a number of storage arrays representing a number of raid arrays each having a raid configuration, where each of the storage arrays includes one or more virtual disks, where each of the one or more virtual disks is associated to at least one PE, where the at least one PE includes one of: a local PE or an external PE, where the external PE is external to the storage node.

In one embodiment, the PEM is configured to communicate with the AGRP to determine available storage arrays that can be used by a file system of the storage node. In one embodiment, the storage node further includes a communication manager to provide a messaging service, where one of the PEM, the LDM or the AGRP uses the messaging service to communicate with one another.

In one embodiment, the PEM is configured to communicate with the LDM, or a remote LDM of another storage node in the cluster, to determine one or more local or remote PEs that are available to be used to create a new storage array within the AGRP. In one embodiment, the PEM is configured to communicate with the AGRP to determine one or more array groups that are accessible a file system of the storage node.

In one embodiment, the LDM is configured to communicate with a PEM of another storage node in the cluster in response to a storage failure of a local PE managed by the LDM. In one embodiment, the LDM is configured to create mapping metadata to map the one or more local PEs to locations at the one or more storage disks.

In one embodiment, the AGRP is configured to send a notification to another storage node in the cluster in response to creating an array group at the AGRP. In one embodiment, the storage arrays of the AGRP includes one or more tiers. In one embodiment, the one or more tiers include at least one of: an active tier, a cache tier or a cloud tier, where two or more tiers can include PEs that reside in a same storage disk.

Figure 1:
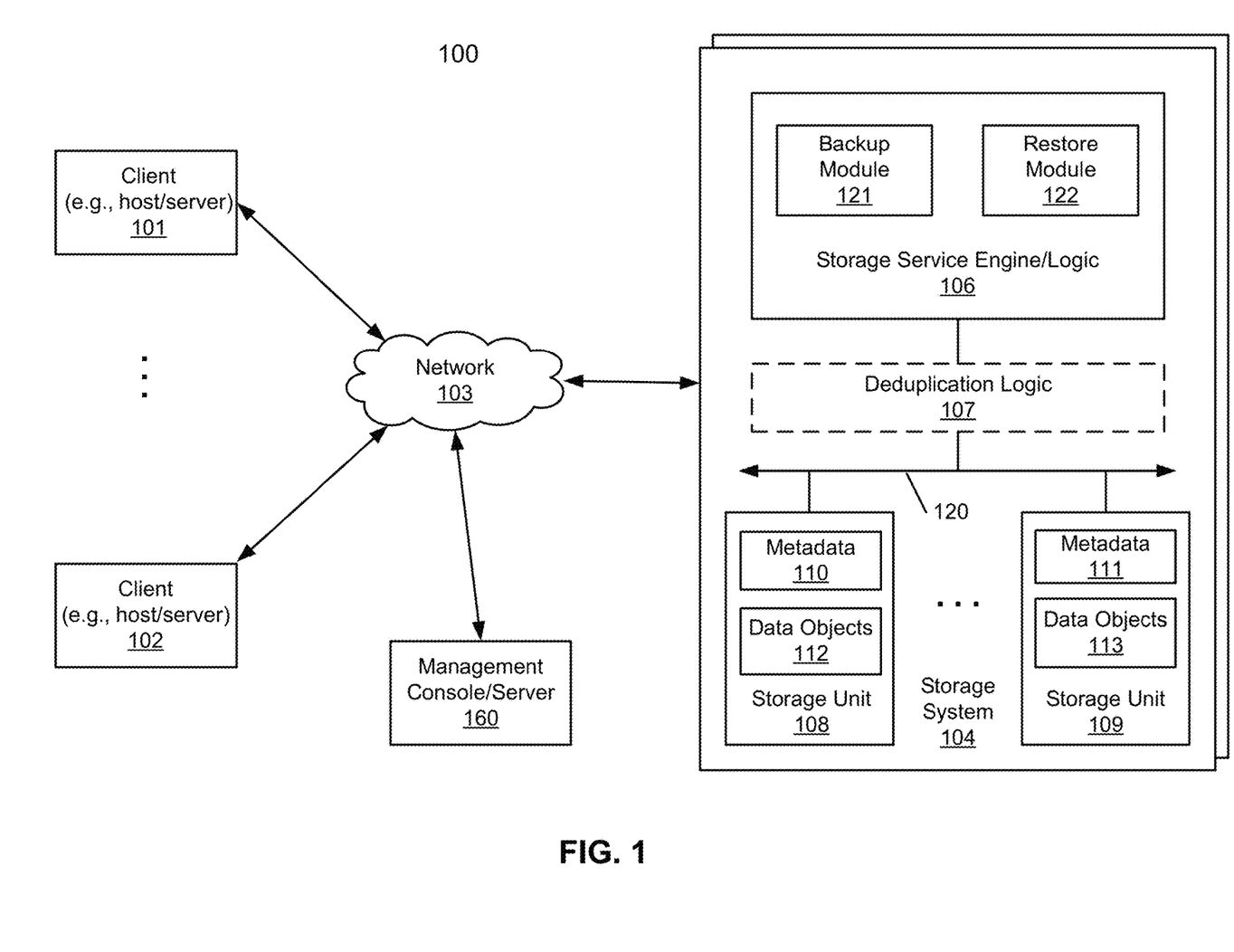
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In some embodiments, storage system 104 can be virtual and/or purpose-built backup appliances (PBBA). A PBBA is a standalone disk-based storage device that is configured and optimized for storing backup data. A virtual backup appliance is a preconfigured storage solution for storing cloud-based backup data. The backup data can be files in a file system of storage system 104.

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below.

Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block.

There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly, there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block.

Figure 2:
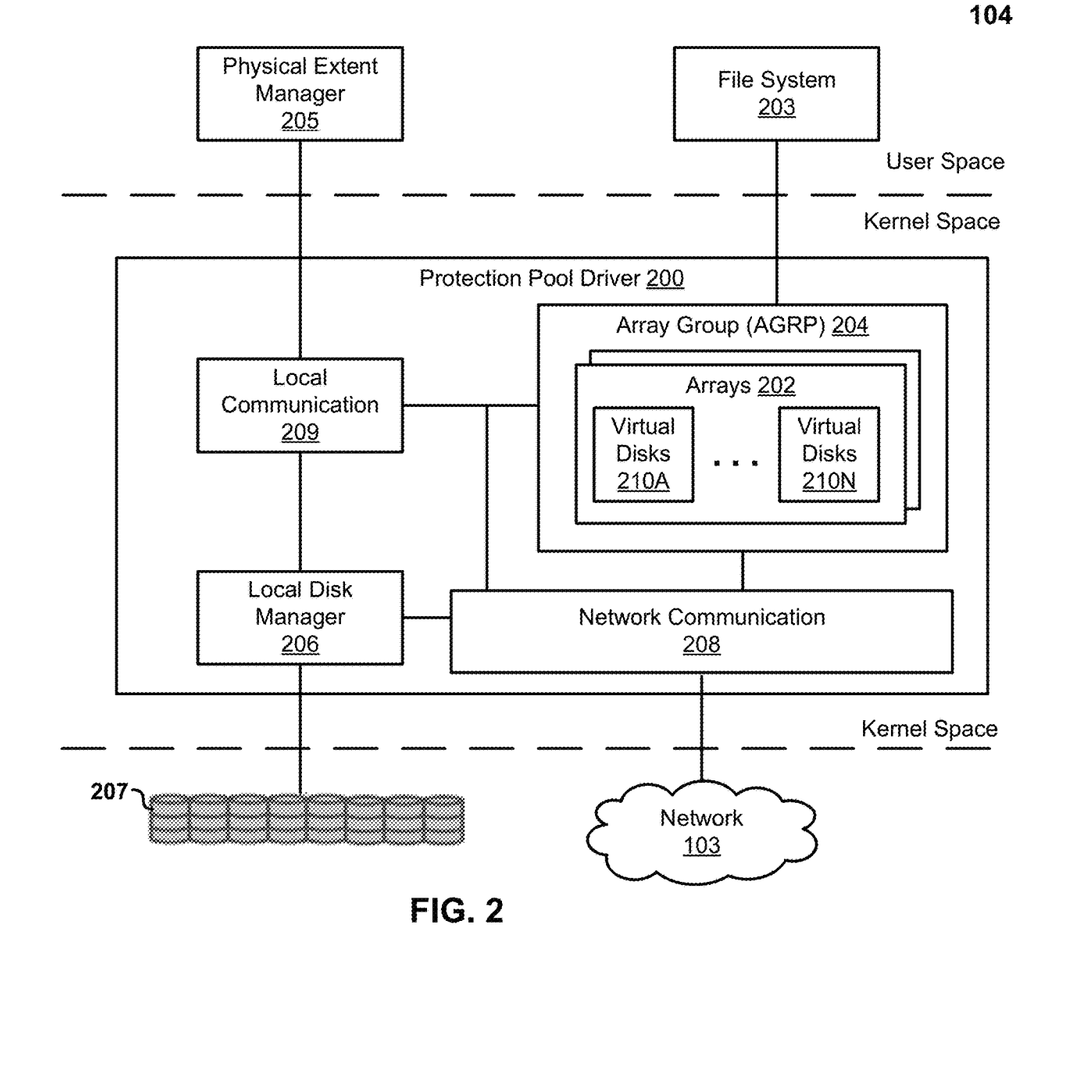
FIG. 2 is a block diagram illustrating an example of a protection pool driver according to one embodiment.

FIG. 2 is an example of a protection pool driver 200 at a storage node 104 according to one embodiment. In one embodiment, protection pool driver 200 is a Linux kernel module that is implemented based on a RAID driver. Different from a traditional RAID driver, protection pool driver 200 manages RAID arrays as part of an AGRP which ties RAID arrays to virtual disks, instead of physical disks. This way, protection pool driver 200 separates the RAID arrays from a direct correlation with physical disks. Although shown as a kernel module, protection pool driver 200 can be implemented as an application used by a user in a user space, or can be implemented as a hardware device.

As shown in FIG. 2, in one embodiment, protection pool driver 200 includes components, such as, array group module (AGRP) 204, local disk manager (LDM) 206, local communication 209, and network communication 208. Protection pool driver 200 can interface with file system 203 and Physical Extent Manager (PEM) 205, where PEM 205 can be an application executed in a user space.

PEM 205 can manage storage allocation/modification requests from file system 203 or user driven event. An instance of PEM 205 can be initiated on each node in a node cluster. PEM 205 on a node can communicate with other components, e.g., AGRP 204/LDM 206, running on the same node or other nodes within a cluster. For example, when additional capacity is required, PEM 205 may request a list of available PEs for array creation from LDMs of one or more nodes in the cluster. PEM can then request allocation of available PEs from the one or more local disk managers (LDMs) on the one or more nodes in the cluster.

AGRP 204 can include one or more arrays (or RAID arrays) 202. RAID arrays can be modified to use virtual disks 210A-210N instead of physical disks, where each virtual disks 210A-210N can include one or more physical extents (PEs) (not shown). A virtual disk 210A can be a module that includes one or more PEs, where a virtual disk 210 of a RAID array represents a stripe unit index of the RAID array. In one embodiment, a predetermined number of PEs (e.g., a column of PEs) can be assigned to a virtual disk 210 (e.g., up to 24 PEs). In one embodiment, a RAID array 202 can be represented by rows (the virtual disks in a RAID array) of columns of PEs (the PEs in a virtual disk), or a two-dimensional (2D) array of PEs, as further described in FIG. 5. In one embodiment, a row of PEs in a 2D array of PEs can function like a child array within the parent RAID array, so long the allocation of each PE in the row of PEs is allocated from a different physical disk. In this case, each row of PEs (child array) performs as a failure domain. E.g., any two PEs in a current row can fail and not affect the other rows. Furthermore, two other PEs can fail on a different row and not affect the current row. This way, the system can tolerate failures up to four physical disks and an array would still be available. In contrast, once a third disk fails in a traditional RAID array with 6+2 configuration, the array is stopped and the system is required to be recovered.

AGRP 204 can manage the creation of arrays 202 and can generate unique identifiers for arrays 202, where arrays 202 can be reassembled or migrated to other nodes within a cluster. AGRP 204 can manage the creation, reconstruction, reassemble, disassemble, and destruction for arrays 202 of AGRP 204. RAID arrays 202 managed by AGRP 204 can thus dynamically grow and shrink by allocated additional storage from physical disks of any nodes within the cluster. In one embodiment, when a node in the cluster fails, AGRP 204 can be migrated from a failing node to another node so access to arrays 202 managed by AGRP 204 can be maintained. In one embodiment, depending on the RAID configuration, RAID array 202 of AGRP 204 can be a protected storage array that is resilient against multiple disk and/or single node failures.

In one embodiment, AGRP 204 can be created on any node in the cluster, migrate to any node in the cluster, but can only be assembled on one node at a time. AGRP 204 can have a unique identifier that PEM 205 can use to access AGRP 204 and its arrays. Thus, AGRP can manage the arrays that represent one or more storage partitions available to node 104.

In one embodiment, each of PEs may be designated with an address. Thus, a virtual disk 202 can include a list of addresses (e.g., PEs), where each address (PE) points to a specific location on one or more physical disks 207 on a same storage node 104 or a different storage node within a node cluster. In one embodiment, the list of addresses can be represented by UUIDs. In one embodiment, PEs can be mapped to a physical disk 207 across the cluster, where the mapping is performed by a local disk manager that is managing physical disk 207.

Local communication component 209 can process I/O requests among components of node 104. For example, local communication component 209 can bridge the communication between PEM 205, file system 203, and any components (e.g., LDM 206, AGRP 204, network communication component 208) of protection pool driver 200.

Network communication component 208 can process I/O requests among different components of node 104 or any other nodes within the cluster. For example, when a node issues I/O requests for a PE, the I/O request can be redirected, by AGRP of the node, to a physical disk/node within the cluster, e.g., a destination where the requested PE can be found. In one embodiment, network communication component 208 may be interconnected to other storage nodes at a kernel driver layer to direct the I/O request from a sending node to a receiving node. For example, a node receiving an I/O request may process the I/O request by retrieving a PE from a storage disk at the receiving node. Once the I/O request is complete, data from the PE may be returned from the receiving node to the sending node, via network communication component 208.

LDM 206 can manage physical disks 207 on node 104. LDM 206 can divide each disk 207 into one or more PEs and manage the allocation and ownership of these PEs. For example, LDM can manage the approval of allocation/deallocation of PEs for arrays. Allocation/deallocation of PEs can be requested by PEM, for array creation, array expansion. For example, a PEM can request PEs for allocation, LDM can approve or reject the PEM request. For another example, if PEMs on two separate nodes request a same PE for allocation at a same time, LDM can approve the request for one PEM but would have to deny the allocation request for another PEMs, since the PE would no longer be available. In one embodiment, when LDM 206 receives concurrent requests, the approval selection process can be based on a first in line. In another embodiment, the approval selection process can be based on a latency, e.g., the requests can include a latency indicator and the PE is allocated to requests with a lower latency indicator.

Figure 3:
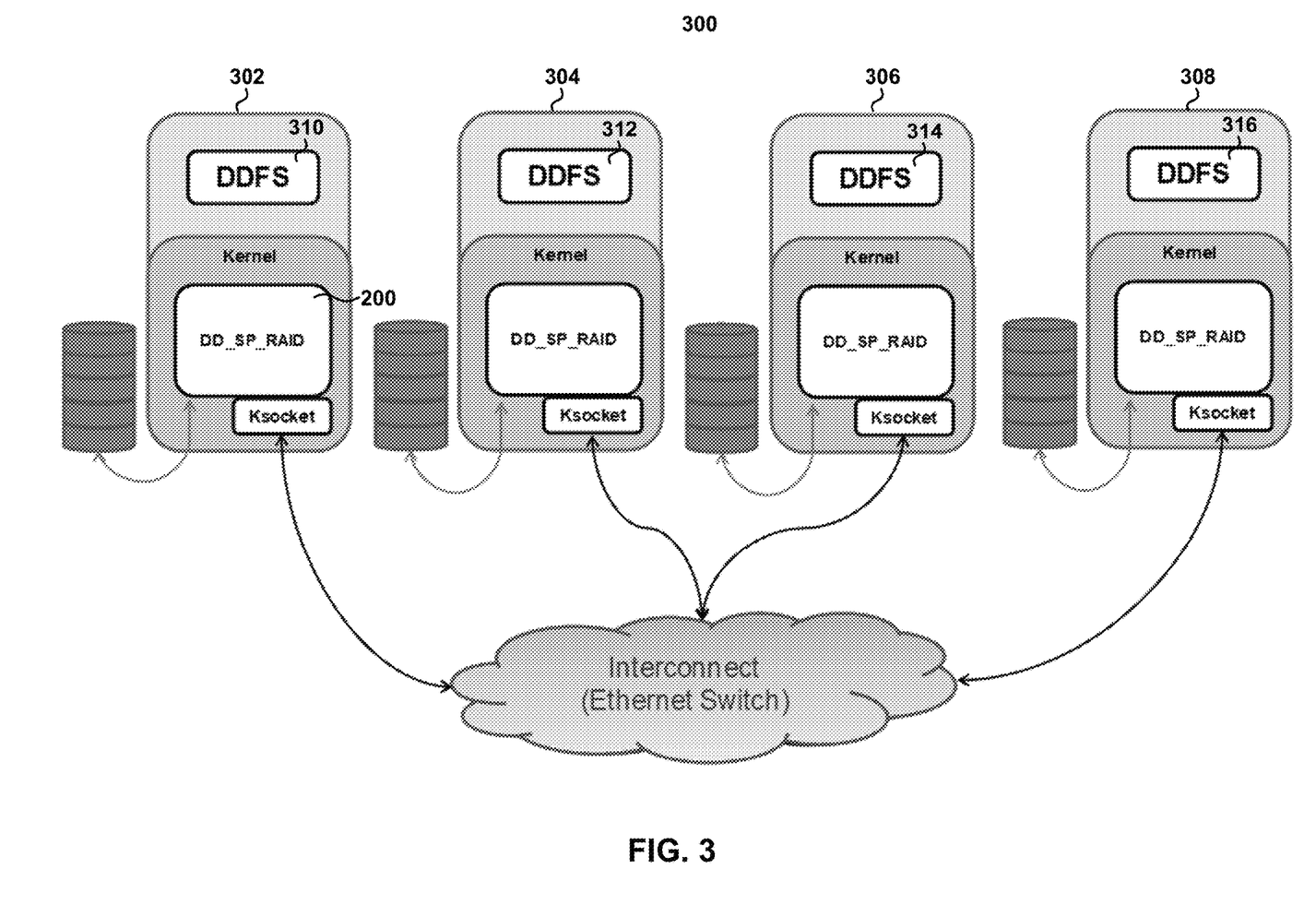
FIG. 3 is a block diagram illustrating an example of a cluster according to one embodiment.

FIG. 3 is an example of a cluster 300 according to one embodiment. As shown, data for four file systems (e.g., file systems (DDFS) 310, 312, 314, and 316) are spread across four nodes 302-308 of cluster 300. Each of nodes 302-308 can represent node 104 of FIGS. 1-2, and network traffic can be managed by network communication components (such as component 208 of FIG. 2) of nodes 302-308. The network traffic between nodes 302-308 can be based on TCP/IP network communication protocol. Note that any other communication protocols, that are readily known to one skilled in the art, can be used.

Figure 4:
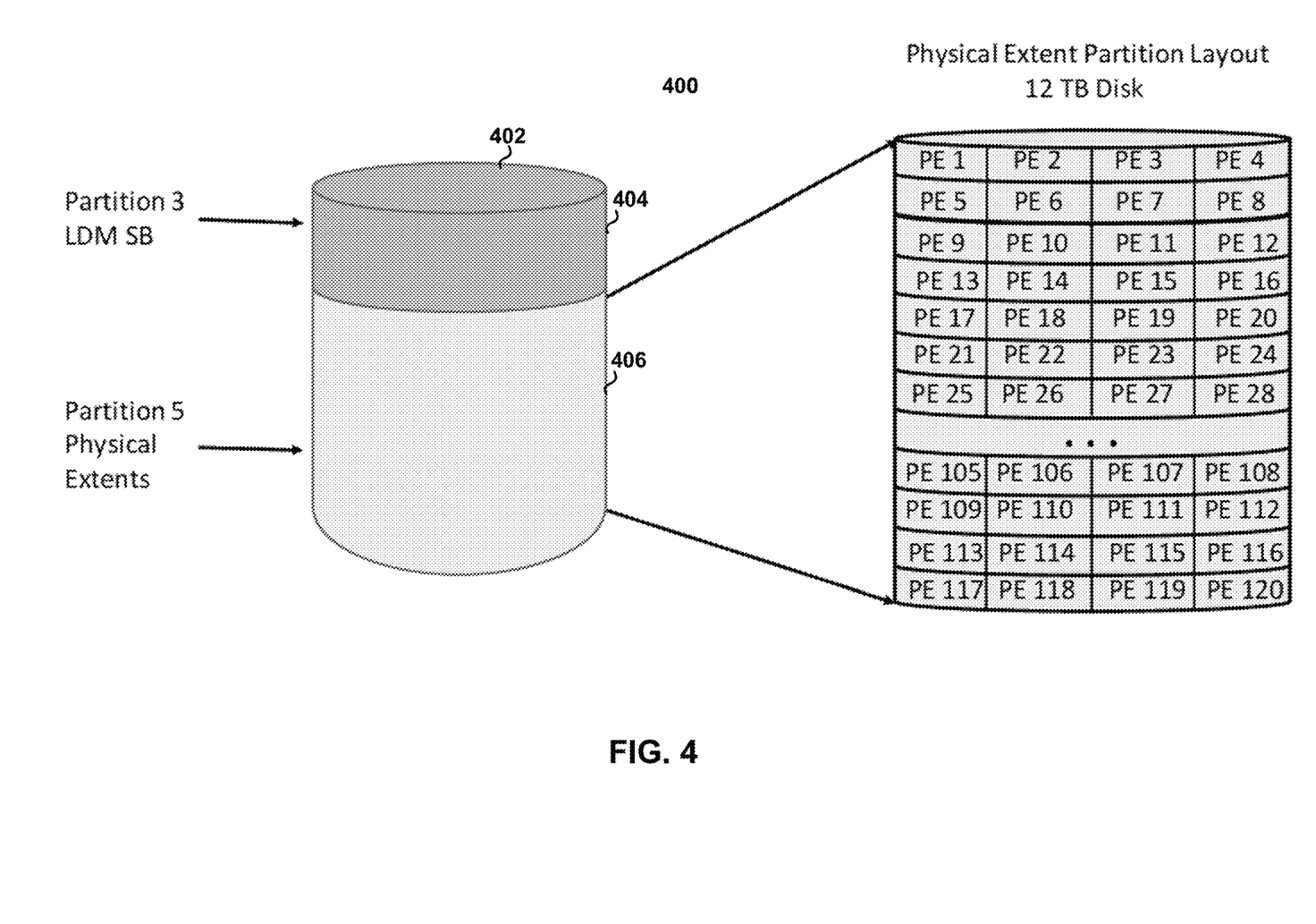
FIG. 4 is an example of a physical extent partition layout according to one embodiment.

FIG. 4 is an example of a physical extent (PE) partition layout 400 according to one embodiment. PEs 1-120 can be the basic units of storage allocation for a node, such as node 104 of system 100 of FIG. 1-2. A PE can represent a range of contiguous logical block address (LBA) of a physical disk 402. Physical disk 402 may be divided into a number of PEs, where each PE has an equal size. The size of a PE may be the same for all PEs across the cluster.

In one embodiment, physical disk 402 can be divided into a superblock (SB) partition 404 and a data (e.g., PEs) partition 406. SB Partition 404 can include metadata storing mapping information for the PEs, e.g., address locations on the physical disk, an identifier for the physical disk, and an identifier for a node where the PEs can be found, etc. Data (e.g., PEs) partition 406 can include PEs where file system data are stored. As shown in FIG. 4, a 12 Terabyte (TB) data partition 406 may be divided into equally sized PEs. For example, data partition 406 can include 120 PEs (e.g., PE1, PE2, PE3, . . . , PE120).

Note that it may not be a requirement that all physical disks in the cluster have the same capacity. E.g., physical disks in a node and/or a cluster can have a same or different capacities. In one embodiment, the PE size for a cluster can be different. For example, a PE size of 96 Gigibyte (GiB) can be used for a virtual backup appliance and a PE size of 186 GiB can be used for a standalone PBBA.

Figure 5:
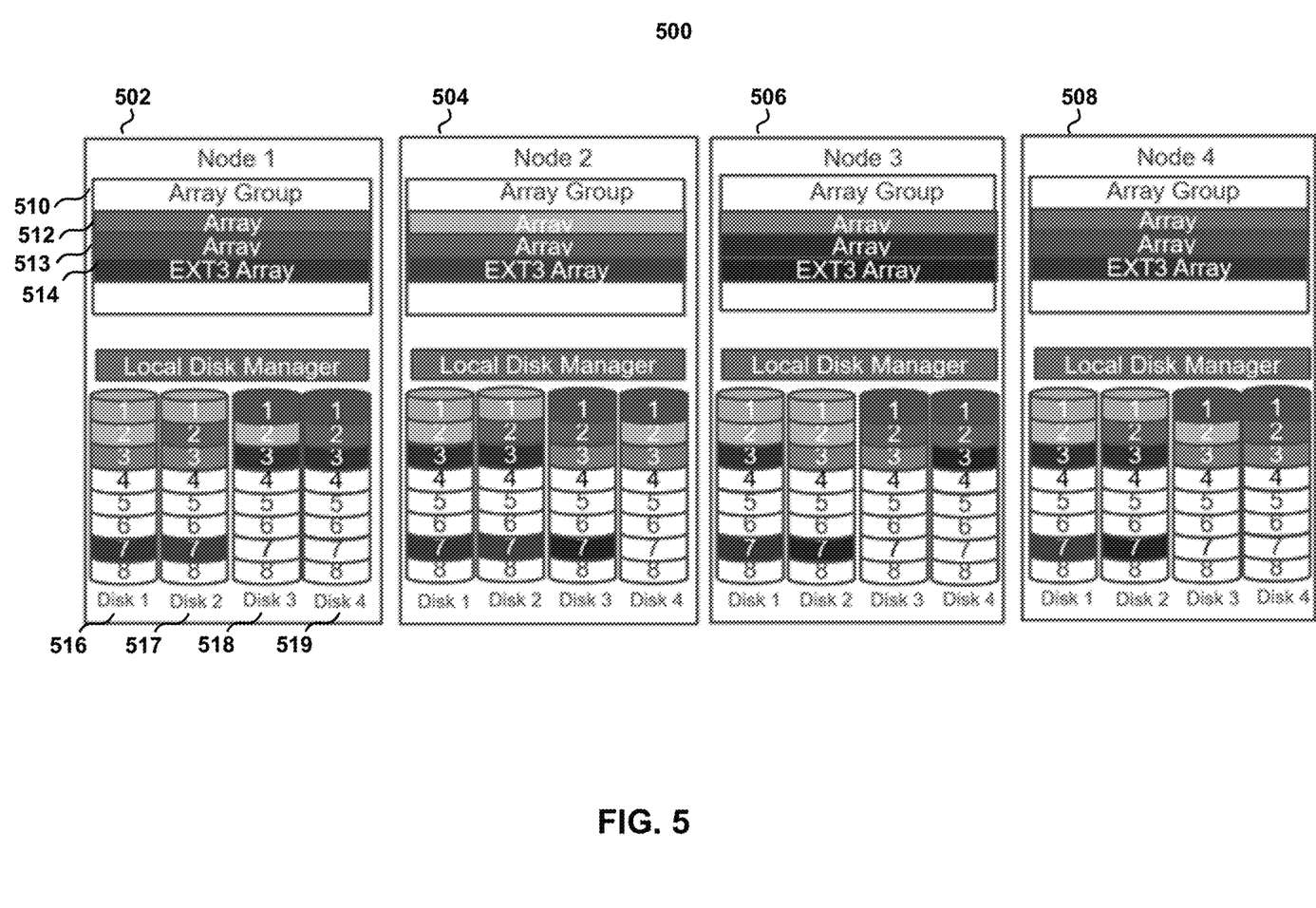
FIG. 5 is an example of a PE layout for a cluster in a multi-node environment according to an embodiment.

FIG. 5 illustrates an example of a PE layout for a cluster 500 in a multi-node environment according to an embodiment. Referring to FIG. 5, cluster 500, for example, may be a four-node cluster in which each node has an array group AGRP (e.g., 510) with two 6+2 arrays 512-513 (e.g., 6 data virtual drives and 2 parity virtual drives) and one EXT3 514, which is a 3-way mirrored array. Here, parity virtual drives can be XOR and/or Reed Solomon parity drives, or any other types of parity drives.

In this example, each of nodes 502-508 includes four physical disks 516-519, and each physical disk includes 8 PE's (PEs 1-8). With four nodes 502-508 in this example, PEM can configure AGRP with RAID arrays 512-513 and EXT3 array 514. EXT3 array of node 1 can be allocated with 3 PEs: PE 7 from disk 1 of node 1, PE 7 from disk 1 of node 2, and PE 7 from disk 1 of node 3, for the 3-way mirror. Note that any of nodes 502-508 can represent node 104 of FIGS. 1-2.

As previously described, array 512 can be configured as 6+2 RAID array, where each array index corresponds to a virtual disk and each virtual disk includes one PE for a simplified illustration. Thus, as shown in FIG. 5, array 512 includes 8 virtual disks, where the 8 virtual disks correspond to: PE1 from disk 1 of node 1, PE1 from disk 2 of node 1, PE1 from disk 1 of node 2, PE1 from disk 2 of node 2, PE1 from disk 1 of node 3, PE1 from disk 2 of node 3, PE1 from disk 1 of node 4, and PE1 from disk 2 of node 4. Array 512 is also representative of a 2D array of PEs. In this case, the 2D array contains a row of 8 PEs, where each PE in the row of 8 PEs is allocated to different disks among the nodes in the cluster.

Array 513 can be allocated as a 6+2 RAID array, where each array index is a virtual disk and each virtual disk has a PE to simplify the illustration. Thus, array 513 includes 8 virtual disks, where the 8 virtual disks correspond to: PE1 from disk 3 of node 1, PE1 from disk 4 of node 1, PE1 from disk 3 of node 2, PE1 from disk 4 of node 2, PE1 from disk 3 of node 3, PE1 from disk 4 of node 3, PE1 from disk 3 of node 4, and PE1 from disk 4 of node 4. In this example, the layout can support any two failed physical disks in a node, or any one failed node. Note that the number of PE within a virtual disk of the present disclosure is not limited to what is shown in the layout of FIG. 5.

As shown in the example in FIG. 5, any nodes in a cluster can include an array group with one or more arrays, where the data in the one or more arrays are distributed among different nodes in the cluster. Here, node 1 502 includes array group 510 having three arrays 512-514. Data associated with array 512 (or arrays 513-514) of array group 510 in node 1 502 are distributed among nodes 1-4 (502-508) in cluster 500. In this manner, data can be spread across multiple nodes.

For each array, there may be one or more virtual disks, and a virtual disk can include one or more PEs. That is, PEs can be grouped into virtual disks, and the virtual disks are then associated to an array. There is no restriction as to which physical disk or node the PE resides on, but the allocation of PEs on physical disks for an array can be managed such that PEs in any row of a RAID array are not allocated to a same physical disk. This way, for example, a RAID array with 6+2 virtual disks retains the redundancy/mirror aspect of the RAID configuration. That is, as described in the example of FIG. 5, the 6+2 arrays 512-513 supports up to two disk failures in any node, and/or a single node failure. For example, arrays 512-513 can still function even if node 1, disk 1 and node 1, disk 2 fails, or all physical disks in node 2 failed.

Although 6+2 RAID arrays are shown, arrays can be created for different RAID levels. When an array is created, the RAID level is assigned and there is no requirement that the arrays have the same RAID level or the same number of PEs on a node.

Identifiers for PE Mappings

Below is an example where a protection pool driver can use a 128-bit UUID to identify a AGRP, an array, a LDM, a physical disk, and/or a PE. The UUID layout allows mapping of arrays to AGRPs and PE offsets to a disk, a LDM, and/or a Node. Below Table 1 that illustrates an example of the 128-bit UUID.

TABLE 1

| Type | Bits 95-127 | Bits 64-95 | Bits 32-63 | Bits 0-31 |
|---|---|---|---|---|
| AGRP UUID | AGRP Magic Number | 32 bit AGRP UID | Reserved | Reserved |
| Array UUID | AGRP Magic Number | 32 bit AGRP UID | 32 bit Array UID | Reserved |
| LDM UUID | 32 bit Node UID | 32 bit LDM UID | Reserved | Reserved |
| LDM Disk UUID | 32 bit Node UID | 32 bit LDM UID | 32 bit disk UID | Reserved |
| PE UUID | 32 bit Node UID | 32 bit LDM UID | 32 bit Node UID | 32 bit PE Offset |

Each PE may be assigned a PE UUID. PE UUID may be used to identify the location of the extent. In one embodiment, PE UUID can include four 32-bit parts that describes the location of the PE. In some embodiments, the PE UUID may include a NODE UUID, LDM UUID, DISK UUID, and the PEs physical LBA offset within a partition of the disk. One example of the PE UUID is shown in table 2 below.

TABLE 2

| Node | LDM | Disk | Extent | |
|---|---|---|---|---|
| Row: 1 Vdisk: 0 0x11111111: | 0x620E0700: | 0xE1640700: | 0x00000008 | In Use |
| Row: 1 Vdisk: 1 0x11111111: | 0x620E0700: | 0x4646F000: | 0x00000008 | In Use |
| Row: 1 Vdisk: 2 0x22222222: | 0xA6D7FD00: | 0x5A46D400: | 0x00000008 | In Use |
| Row: 1 Vdisk: 3 0x22222222: | 0xA6D7FD00: | 0xF479BA00: | 0x00000008 | In Use |
| Row: 1 Vdisk: 4 0x33333333: | 0xFD5D6200: | 0xE3839B00: | 0x00000008 | In Use |
| Row: 1 Vdisk: 5 0x33333333: | 0xFD5D6200: | 0x6BA23600: | 0x00000008 | In Use |
| Row: 1 Vdisk: 6 0x44444444: | 0x7FB69600: | 0x62521800: | 0x00000008 | In Use |
| Row: 1 Vdisk: 7 0x44444444: | 0x7FB69600: | 0x215B7500: | 0x00000008 | In Use |

A 128-bit AGRP UUID can be used to reference an AGRP. The AGRP UUID can include a 32-bit magic number and a 32-bit AGRP UID. When arrays are created, an array UUID can be created by using the AGRP UUID and adding the 32-bit Array UID to the AGRP UUID. Associating arrays to a AGRP UUID allows the AGRP and its constituent arrays to migrate to different nodes with ease, e.g., by referring to the AGRP UUID.

A 128-bit LDM UUID can be used to reference a LDM. LDM UUID can indicate which node has ownership of the LDM, and which disks belong to the LDM. Furthermore, LDM UUID can provide a location of a PE when the PE UUID is compared with LDM UUID and/or a disk UUIDs. For example, when a LDM is instantiated, a base LDM UUID is instantiated to include the node UID and the LDM UID. As a physical disk is added, a disk UUID is created for each physical disk, where the disk UUID includes the LDM base UUID and the disk UID. Since, PE UUID can include a NODE UUID, LDM UUID, DISK UUID, and the PE's physical LBA offset within the PE partition of the physical disk, thus, the PE and LDM/disk UUIDs can be compared for matching portions, where the matching portions are indicators of a location of the PE.

Figure 6:
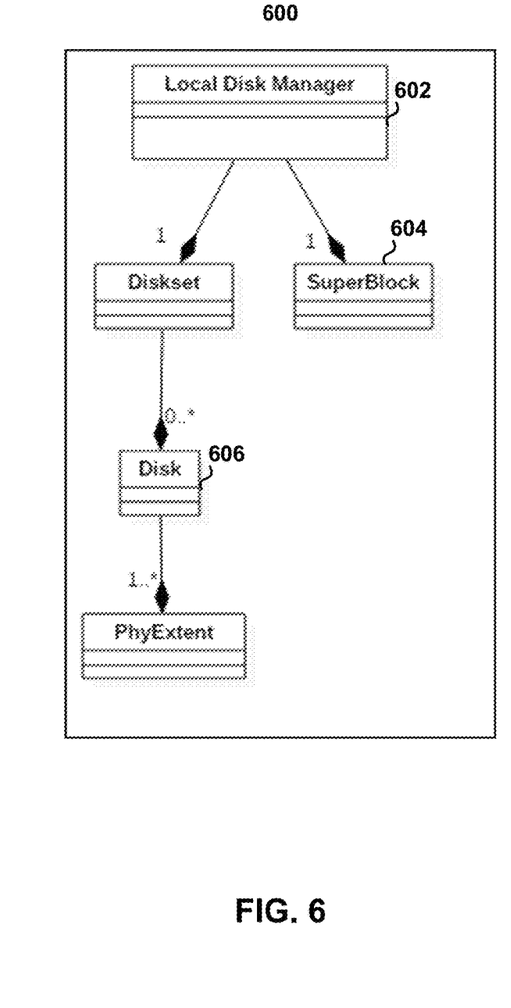
FIG. 6 is an illustration depicting an example of local disk manager according to one embodiment.

FIG. 6 shows an example of Local Disk Manager (LDM) architecture according to one embodiment. LDM 602 can manage the physical disks on a node. LDM 602 can initiate creation of a PE map, manage PE allocations, perform proactive disk error monitoring, disk failure management, maintain a current state of disks and/or PEs, and manage metadata of the PEs. In one embodiment, zero or more LDMs 602 can be present on a single node. Zero LDMs 602 can indicate that there is no internal storage (e.g., disks 606) available at the node. Having more than one LDM 602 can allow disks 606 to be grouped based on disk characteristics. In one embodiment, a single LDM 602 can manage a predetermined number of disks (e.g., 132 disks). As described previously, LDM 602 can manage allocation and current ownership of PEs. The LDM can allocate the PEs and store the current owner in LDMs superblock data. At boot up, LDM 602 can provide a current state for PEs managed by LDM 602 to PEMs of one or more nodes.

In one embodiment, when disk(s) are added to LDM 602, a performance group can be assigned to the disks. The performance groupings provide PEM indications if the PE should be allocated to arrays of which performance tiers. In one embodiment, LDM 602 can also monitor physical disk errors and notify a PEM when a disk has exceeded an error threshold and/or when maintenance is required. For example, when a write error occurs, an array may fail, and AGRP of the array may notify the LDM that the PE has failed. LDM subsequently can notify each array that have PEs allocated on the failing disk, broadcast a message to PEMs on all nodes indicating a disk failed. In one embodiment, arrays with failed PEs may run in a degraded state until a replacement PE is allocated by PEM.

Figure 7:
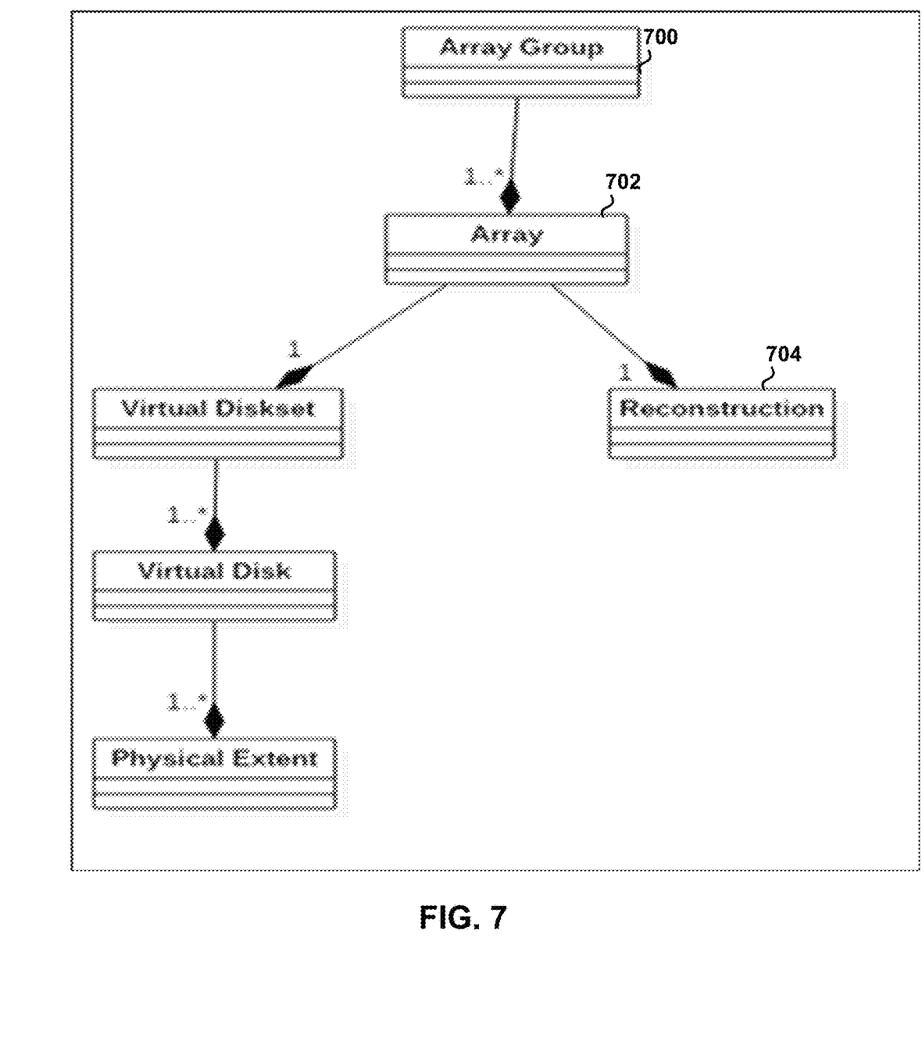
FIG. 7 is an illustration depicting an example of array group according to one embodiment.

FIG. 7 shows an example of an array group (AGRP) 700 having a collection of arrays 702 that belong to a file system partition according to one embodiment. Array group 700 may be configured to manage the creation, reconstruction, reassemble disassemble and destroying of associated arrays 702. The AGRP 700 can be created on any node in the cluster and can migrate to any node in the cluster but can only be assembled on one node at a time. The AGRP 700 can have a unique ID that can be used to identify the AGRP. In one embodiment, each of arrays 702 in AGRP 700 can be associated with an active tier, cache tier and/or cloud tier, and two or more tiers can be associated with PEs that reside in a same storage disk. The different tiers (e.g., active tier, cache tier and/or cloud tier, etc.) allow the arrays to be identified for different usages, such as for active storage where data is frequently accessed, cache storage where data is cached, or cloud storage where data is associated to a cloud server. The tiers can indicate a performance requirement and/or up time requirement associated with the array.

Note that some or all of the components as shown and described above (e.g., components 202, 204, 205, 206, add 208 of FIG. 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
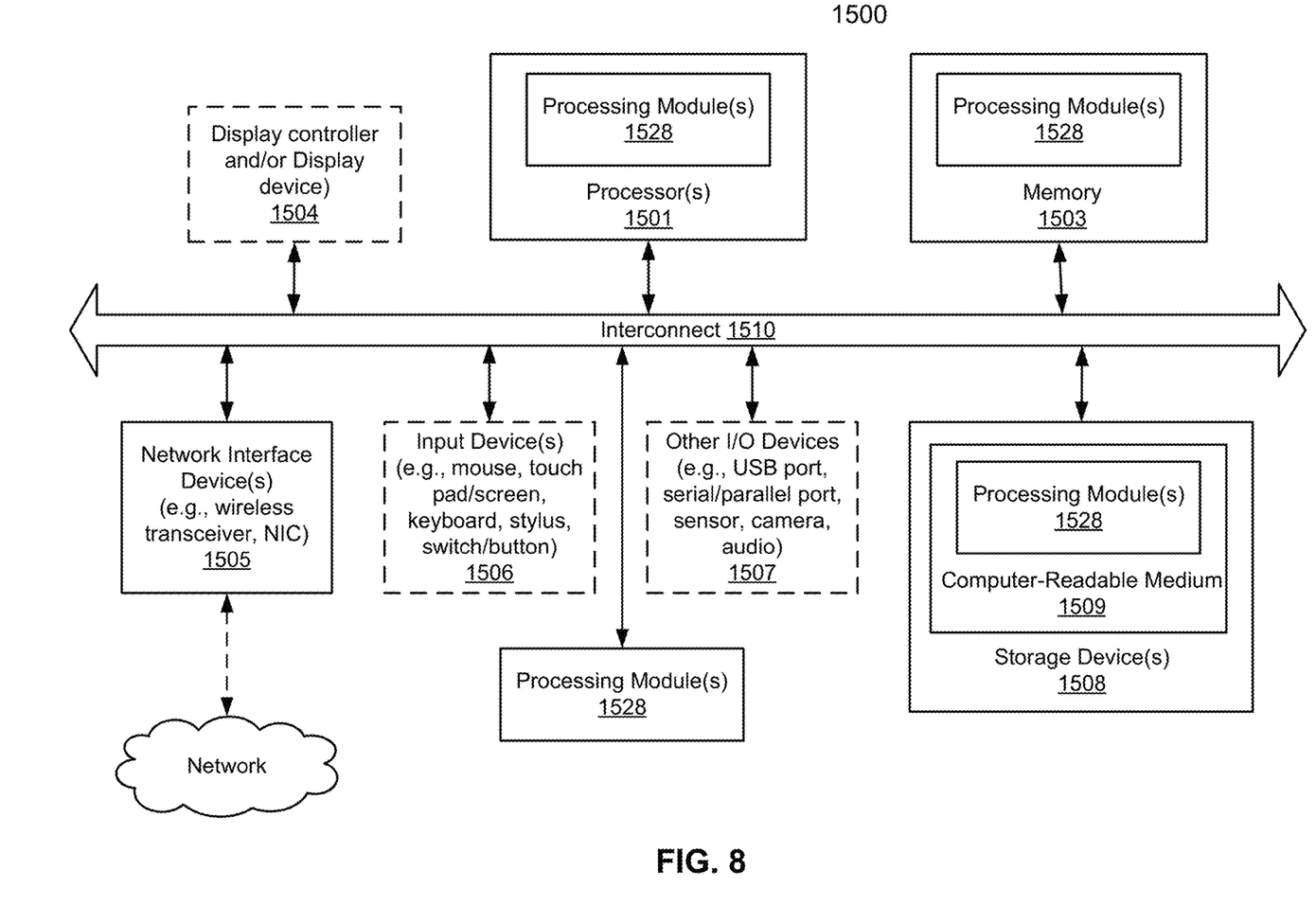
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, any of components 200-209 of FIG. 2, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A redundant array of independent disks (RAID) array, comprising:
one or more virtual disks representing a RAID configuration of the RAID array, wherein each of the one or more virtual disks comprises a plurality of physical extents (PEs), the plurality of PEs having a same size, a first virtual disk of the one or more virtual disks comprising a first PE and a second PE,
wherein the first PE is located in a first physical disk of a first storage node of a cluster and the second PE is located in a second physical disk of a second storage node of the cluster, the first storage node of the cluster different from the second storage node of the cluster, the first PE managed by a first local disk manager (LDM) executing on the first storage node, the second PE managed by a second LDM executing on the second storage node, and the first virtual disk managed by an array group manager (AGM), the AGM executing on a third storage node, the third storage node different from the first storage node and the second storage node.

2. The RAID array of claim 1, wherein each of the one or more virtual disks corresponds to a stripe unit index of the RAID array.

3. The RAID array of claim 1, comprising a 6+2 RAID configuration, wherein the one or more virtual disks of the 6+2 RAID configuration comprises six data virtual disks and two parity virtual disks.

4. The RAID array of claim 1, wherein each of the plurality of PEs has a unique identifier identifying a physical address of the PE, wherein the physical address of the PE comprises: an address corresponding to a storage node, a physical disk of the storage node, and a logical block address on the physical disk.

5. The RAID array of claim 1, wherein the size of the plurality of PEs is configurable when the cluster is initially created.

6. The RAID array of claim 1, wherein an ownership of a PE is verified by an LDM of the PE in at least one of conditions: when the RAID array with the PE is created, the RAID array having the PE is expanded, or the PE is part of a parity virtual disk that is allocated to the RAID array.

7. The RAID array of claim 1, wherein a PE is approvable by an LDM before the PE is allocated to the RAID array.

8. The RAID array of claim 1, wherein the PE is not approved by a LDM if the LDM has approved the PE for another RAID array.

9. The RAID array of claim 1, wherein the RAID array is used by a file system running on the first storage node.

10. The RAID array of claim 1, wherein the RAID array comprises one of levels: RAID 0, RAID 1, RAID 2, RAID 3, RAID 4, RAID 5, RAID 6, or a combination there of.

11. A first storage node comprising a plurality of redundant array of independent disks (RAID) arrays, wherein a RAID array comprises:
one or more virtual disks representing a RAID configuration of the RAID array, wherein each of the one or more virtual disks comprises a plurality of physical extents (PEs), the plurality of PEs having a same size, a first virtual disk of the one or more virtual disks comprising a first PE and a second PE,
wherein the first PE is located in a first physical disk of the first storage node of a cluster and the second PE is located in a second physical disk of a second storage node of the cluster, the first PE managed by a first local disk manager (LDM) executing on the first storage node, the second PE managed by a second LDM executing on the second storage node, and the first virtual disk managed by an array group manager (AGM), the AGM executing on a third storage node, the third storage node different from the first storage node and the second storage node.

12. The RAID array of claim 11, wherein each of the one or more virtual disks corresponds to a stripe unit index of the RAID array.

13. The RAID array of claim 11, comprising a 6+2 RAID configuration, wherein the one or more virtual disks of the 6+2 RAID configuration comprises six data virtual disks and two parity virtual disks.

14. The RAID array of claim 11, wherein each of the plurality of PEs has a unique identifier identifying a physical address of the PE, wherein the physical address of the PE comprises: an address corresponding to a storage node, a physical disk of the storage node, and a logical block address on the physical disk.

15. The RAID array of claim 11, wherein the size of the plurality of PEs is configurable when the cluster is initially created.

16. The RAID array of claim 11, wherein an ownership of a PE is verified by an LDM of the PE in at least one of conditions: when the RAID array with the PE is created, the RAID array having the PE is expanded, or the PE is part of a parity virtual disk that is allocated to the RAID array.

17. The RAID array of claim 11, wherein a PE is approvable by an LDM before the PE is allocated to the RAID array.

18. The RAID array of claim 11, wherein the PE is not approved by a LDM if the LDM has approved the PE for another RAID array.

19. The RAID array of claim 11, wherein the RAID array is used by a file system running on the first storage node.

20. The RAID array of claim 11, wherein the RAID array comprises one of levels: RAID 0, RAID 1, RAID 2, RAID 3, RAID 4, RAID 5, RAID 6, or a combination there of.

* * * * *